United States Patent
Meehan

(10) Patent No.: US 6,763,229 B2
(45) Date of Patent: Jul. 13, 2004

(54) TIMING RECOVERY SWITCHING FOR AN ADAPTIVE DIGITAL BROADBAND BEAMFORMING (ANTENNA DIVERSITY) FOR ATSC TERRESTRIAL DTV BASED ON SEGMENT SYNC DETECTION

(75) Inventor: Joseph Patrick Meehan, New York City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 582 days.

(21) Appl. No.: 09/847,215

(22) Filed: May 2, 2001

(65) Prior Publication Data

US 2002/0187767 A1 Dec. 12, 2002

(51) Int. Cl.[7] .................................................. H04B 7/00
(52) U.S. Cl. ............................... 455/277.1; 455/277.2; 455/278.2; 455/265; 375/355; 375/347
(58) Field of Search ........................... 455/277.1, 277.2, 455/278.2, 204, 132, 208, 260, 265; 375/355, 347, 349, 326, 226, 329, 364, 353, 354, 340; 348/537

(56) References Cited

U.S. PATENT DOCUMENTS 3,851,252 A * 11/1974 Karnaugh et al. .......... 375/353
4,015,205 A    3/1977 Ikeda et al. ................ 325/304
RE33,665 E  *  8/1991 Ogawa ....................... 375/354
5,499,397 A  *  3/1996 Wadin et al. ............. 455/277.1
5,694,434 A  * 12/1997 Burke ........................ 375/355
5,742,646 A  *  4/1998 Woolley et al. ............. 375/349
5,905,767 A    5/1999 Fujimura .................... 375/355
6,049,575 A  *  4/2000 Moridi ....................... 375/355
6,304,619 B1 * 10/2001 Citta et al. ................. 375/364
6,359,943 B1 *  3/2002 Lo ............................. 375/340
6,583,822 B1 *  6/2003 Jun ............................ 375/355
6,628,733 B1 *  9/2003 Tomiyoshi et al. ....... 455/277.2

FOREIGN PATENT DOCUMENTS

WO    WO9318593    9/1993    ............ H04B/7/10

* cited by examiner

Primary Examiner—Edward F. Urban
Assistant Examiner—Lana Le
(74) Attorney, Agent, or Firm—Michael E. Belk

(57) ABSTRACT

A synchronization system within a dual antenna receiver employs two timing recovery loops each coupled to a different antenna input. Segment sync lock (detection of a segment sync in the data stream) by one timing recovery loop prompts selection of the timing error from the corresponding timing recovery loop for timing recovery within both loops. Both timing recovery loops are then synchronized utilizing the selected timing error. If sync lock for the selected loop is lost, the other loop is selected to provide timing error to both loops.

20 Claims, 3 Drawing Sheets

TIMING RECOVERY SWITCHING FOR AN ADAPTIVE DIGITAL BROADBAND BEAMFORMING (ANTENNA DIVERSITY) FOR ATSC TERRESTRIAL DTV BASED ON SEGMENT SYNC DETECTION

TECHNICAL FIELD OF THE INVENTION

The present invention is directed, in general, to timing recovery in wireless transmission systems and, more specifically, to timing recovery within synchronization loops for receivers coupled to two or more antennae.

BACKGROUND OF THE INVENTION

Current Advanced Television Systems Committee (ATSC) receivers employ single antenna systems to receive terrestrial digital television (DTV) signals. However, terrestrial wireless signals transmitted to or from a remote station may be reflected from terrain features, fixed or mobile objects such as buildings or vehicles, or discontinuities in the atmosphere. If the reflected signal is not sufficiently absorbed or attenuated, a plurality of different propagation paths are created between the transmitter and receiver, creating a situation referred to as multipath propagation.

Various problems associated with multipath propagation, typically referred to collectively as multipath fading, may dictate throughput and other performance criteria. One suggestion for minimizing the effects of multipath fading during wireless signal transmission, set forth in the Electronics Industry Association/Telecommunications Industry Association (EIA/TIA) proposed standard ISO-2000, employs space-time spreading (STS), in which identically coded data frames are transmitted on each of two (preferably orthogonal) channels utilizing physically displaced antennae.

In a single antenna system, a synchronization loop is required within the receiver to accommodate transmit and receive data rate variances; in a multiple antennae system, a synchronization loop is still required, but multiple inputs (from each antenna) are present. There is, therefore, a need in the art for a robust synchronization mechanism employing signals from two or more antennae.

SUMMARY OF THE INVENTION

To address the above-discussed deficiencies of the prior art, it is a primary object of the present invention to provide, for use in dual antenna receiver, a synchronization system employing two timing recovery loops each coupled to a different antenna input. Segment sync lock (detection of a segment sync in the data stream) by one timing recovery loop prompts selection of the timing error from the corresponding timing recovery loop for timing recovery within both loops. Both timing recovery loops are then synchronized utilizing the selected timing error. If sync lock for the selected loop is lost, the other loop is selected to provide timing error to both loops.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
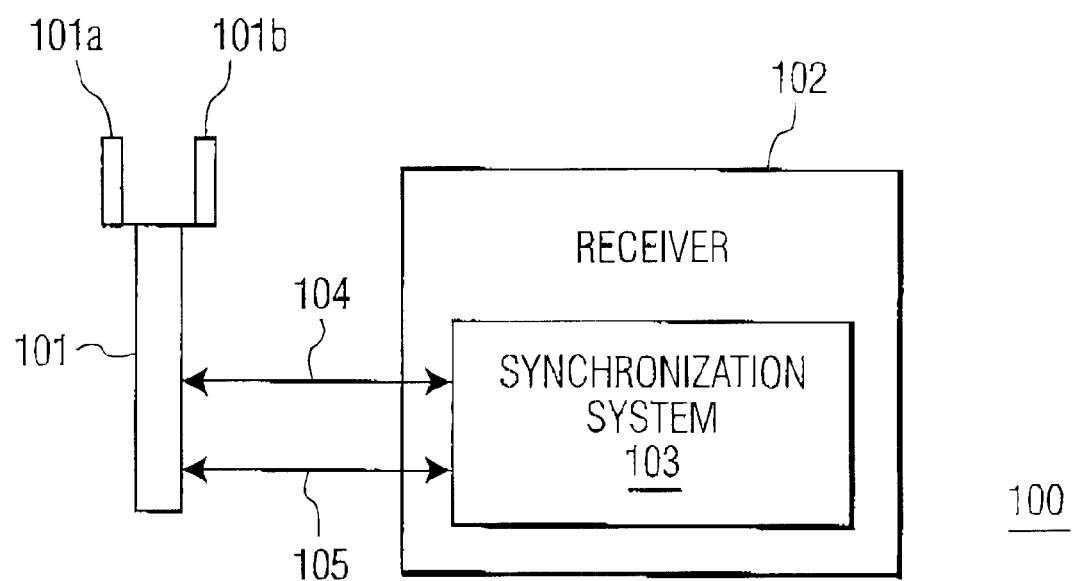
FIG. 1 depicts a multiple antennae receiver system including a synch lock-based synchronization loop for timing recovery according to one embodiment of the present invention.
Figure 2:
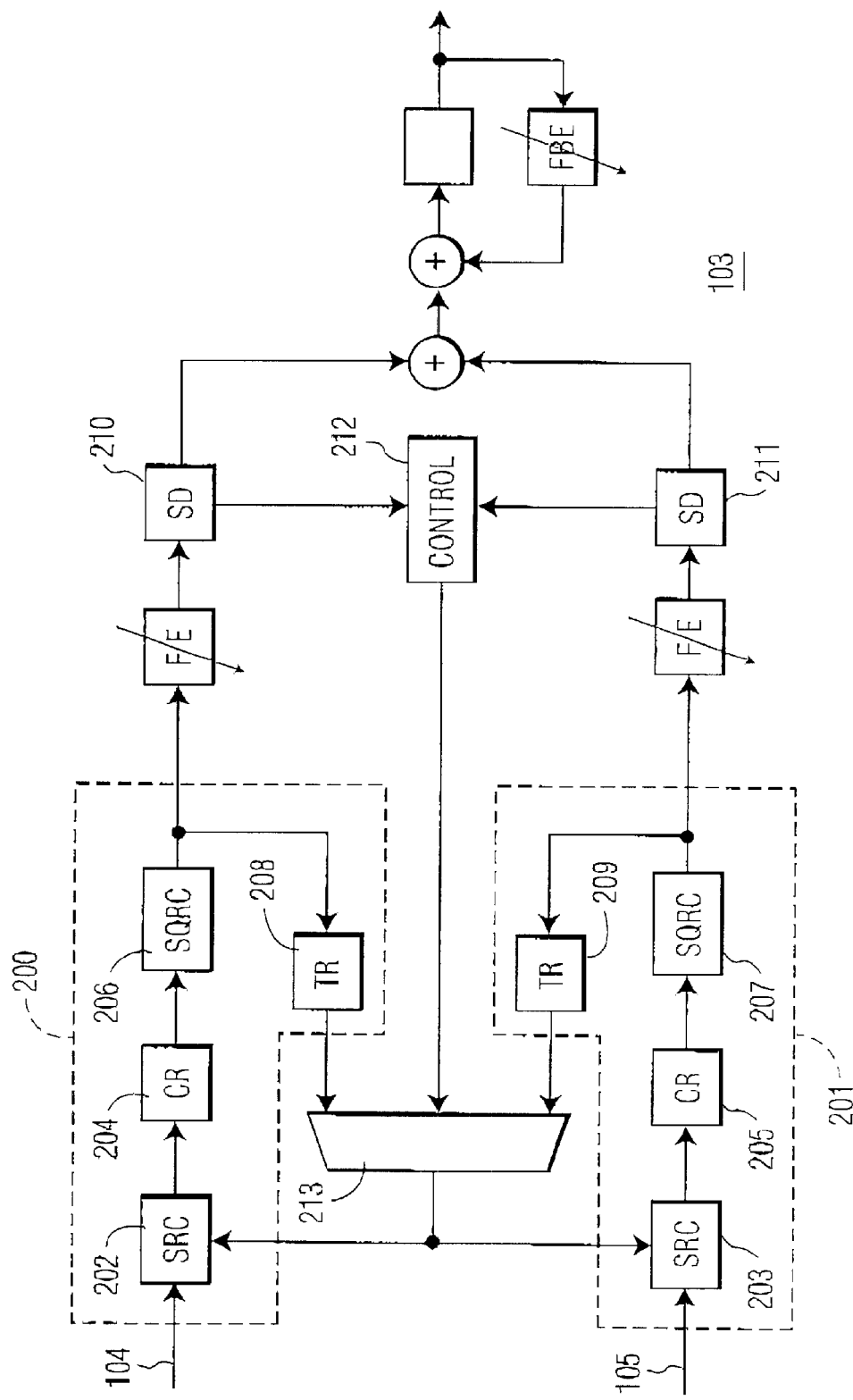
FIG. 2 illustrates in greater detail a synchronization system employing synch lock-based antenna switching for timing recovery according to one embodiment of the present invention.
Figure 3:
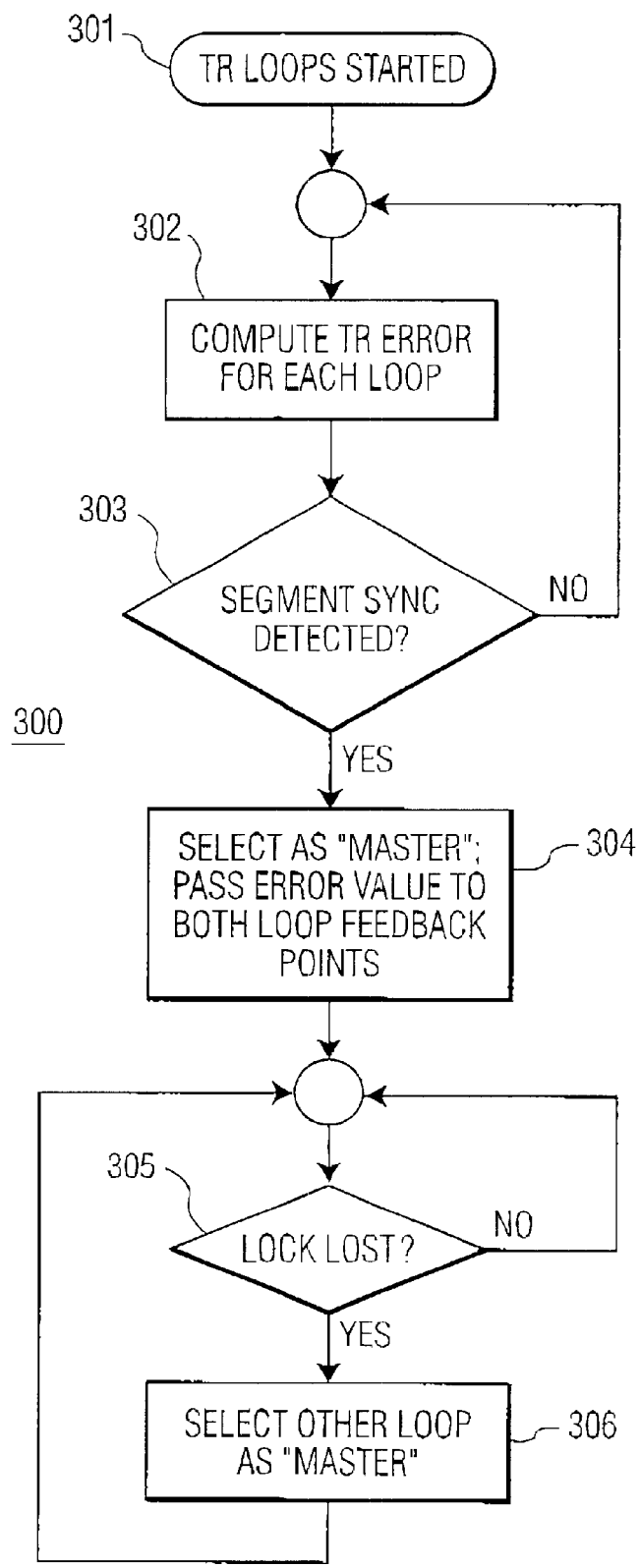
FIG. 3 is a high level flow chart for a process of synch lock-based antenna switching for timing recovery according to one embodiment of the present invention.

FIGS. 1 through 3, discussed below, and the various embodiment used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a multiple antennae receiver system including a synch lock-based synchronization loop for timing recovery according to one embodiment of the present invention. Receiver system 100 includes an antenna array 101 having physically displaced antennae 101a and 101b. Rather than being spaced closely together (e.g., on the order of half a wavelength) for array gain, antennae 101a and 101b are spaced far enough apart to so that received signals fade (almost) independently.

Antenna array 101 is coupled to a receiver 102, a digital television receiver in the exemplary embodiment, receiving separate inputs 104, 105 from antennae 101a and 101b. The present invention may also be employed for any receiver such as, for example, a broadband wireless Internet access receiver. Regardless of the embodiment, however, receiver 102 includes a synchronization system 103 employing differentiator-based antenna switching for timing recovery in accordance with the present invention, as described in further detail below.

Those skilled in the art will perceive that FIG. 1 does not explicitly depict every component within a receiver system. Only those portions of such a system which are unique to the present invention and/or required for an understanding of the structure and operation of the present invention are shown.

FIG. 2 illustrates in greater detail a synchronization system employing synch lock-based antenna switching for timing recovery according to one embodiment of the present invention. Synchronization system 103 includes two timing recovery loops 200 and 201. Independent carrier recovery mechanisms are utilized since separate tuners are employed with antennae 101a and 101b.

Each timing recovery loop 200 and 201 includes a sample rate converter (SRC) 202 and 203 coupled to inputs 104 and 105, respectively, receiving wireless signals from one of antennae 101a and 101b. The output of sample rate converters 202 and 203 are passed to carrier recovery (CR) units 204 and 205, respectively, the outputs of which are connected to square root raised cosine (SQRC) filters 206 and 207. The outputs of square root raised cosine filters 206 and 207 are passed to timing recovery (TR) units 208 and 209, which generate control signals for controlling sample rate converters 202 and 203 to complete timing recovery loops 200 and 201.

Sample rate converters 202 and 203 require input from the timing recovery unit(s) 208 and/or 209 for proper operation, but the timing recovery loops 200 and 201 may fail in poor channel conditions so that a form of diversity is beneficial to the timing recovery algorithm. While signal amplitude and symbol arrival times may vary as a result of multipath propagation, inter-symbol timing is unlikely to be affected. Thus, the timing recovery error for either timing recovery loop 200 or 201 may be employed for the other timing recovery loop with, at most, the addition of some delay factor or constant phase offset.

In the present invention, the timing recovery error from timing recovery units 208 and 209 are controlled by segment synch detection within segment sync detection units 210 and 211. In operation, the system 103 is initialized in "independent" mode, with each of the timing recovery loops 200 and 201 running independently on each antenna input 104 and 105 and multiplexer 213 passing the output of each timing recovery unit 208 and 209 to the sample rate converter 202, 203 within the corresponding timing recovery loop 200 and 201, respectively.

A control unit 212 receives signals from segment sync detection units 210 and 211 when the respective segment sync detection unit 210 or 211 detects a segment sync within the received wireless ATSC signal stream. If either segment sync detection unit 210 or 211 acquires a synch lock (detects multiple segment syncs in the ATSC stream), the respective timing recovery loop 200 or 201 is selected as the "master" timing recovery loop and the error value produced by the corresponding timing recovery unit 208 or 209 is selected for controlling both sample rate converters 202 and 203.

Multiplexer 213, under the control of control unit 212, passes the output of the selected timing recovery unit 208 or 209 to both sample rate converters 202 and 203. Sample rate converters 202 and 203 then utilize the received timing recovery error value to adjust processing of received wireless signals from inputs 104 and 105 (both sample rate converters 202 and 203 therefore sample at the same instant, but at a constant phase offset). If the sync lock is lost by the "master" timing recovery loop, then the control unit 212 switches to the other timing recovery loop as the master.

Of course, numerous variations of the operational scheme described above may be alternatively employed. For example, if the current "master" timing recovery loop 200 or 201 loses sync lock for any reason, the system 103 may be returned to "independent" mode with both timing recovery loops 202 and 203 running independently on the respective antenna input 104 and 105 rather than simply switching directly to the other timing recovery loop. A form of hysteresis in switching between "master" timing recovery loops due to synch lock detection may be employed to preserve stability.

The present invention is particularly beneficial in the case where one antenna sees a very poor channel and cannot acquire a sync lock independently, while the other antenna sees a relatively benign channel and is able to acquire a sync lock. With the present invention, when one antenna 104, 105 and the associated timing recovery loop 200, 201 and segment synch detection unit 210, 211 acquires a sync lock, the total system 103 has a sync lock. An initial simulation, utilizing a relatively benign channel (equalizable by current techniques) together with a very poor channel (which could not be equalized by current techniques or even acquire a sync lock), produced the signal-to-noise ratio (SNR) and symbol error rate (SER) for each successive field sync within a data stream shown in Table I:

TABLE I

| SNR | SER |
| --- | --- |
| 5.586060 dB | 0.640000 |
| 23.757439 dB | 0.005714 |
| 37.408863 dB | 0.000000 |
| 41.548672 dB | 0.000000 |

As shown, the system may be equalized within four field syncs to no symbol errors with an approximately 41 dB signal-to-noise ratio obtained. A standard receiver operating on the poor antenna signal alone could not have decoded the transmitted signals.

FIG. 3 is a high level flow chart for a process of sync lock-based antenna switching for timing recovery according to one embodiment of the present invention. The antenna switching process 300, implemented by synchronization system 103 depicted in FIG. 2, begins with the two timing recovery loops being started and running independently on the inputs from the respective antennae (step 301). The timing errors for both loops are then separately computed (step 302). A determination is then made regarding whether a sync lock has been acquired (by detection of a segment sync signal) by one of the timing recovery loops (step 303). If not, the process returns for further independent calculation of timing error. If so, however, the process selects the timing recovery loop having acquired sync lock as a "master" timing recovery loop (step 304), employing the timing error from that loop for feedback within both timing recovery loops.

A determination of whether the sync lock has been lost is then made (step 305), and either the determination is repeated (step 305), or the other timing recovery loop is selected as the master (step 306). The process continues indefinitely until interrupted by an external process.

The present invention applies antenna diversity to timing recovery, specifically to antenna selection and/or switching for timing recovery. Sync detection is employed to chose which antenna input to employ in timing recovery and synchronization. The synchronization system thus depends only on the antenna which sees the best channel, rather than on the antenna which sees the worst channel or some combination of the best and worst channels. Even if one of the antennae is unable to acquire a sync lock independently, total system sync lock is acquired. The probability of getting a timing recovery sync lock for an ATSC receiver utilizing timing recovery-based antenna switching in a dual antenna system is much higher than using independent synchronization.

Although the present invention has been described in detail, those skilled in the art will understand that various changes, substitutions and alterations herein may be made without departing from the spirit and scope of the invention it its broadest form.

What is claimed is:

1. A synchronization system for switching between timing recovery errors within a dual antenna receiver comprising:
   first and second timing recovery loops, each coupled to a different antenna input and computing a respective timing error;
   first and second sync detectors coupled respectively to said first and second timing recovery loops; and
   a control mechanism receiving sync detection signals from said first and second sync detectors and, upon receiving a sync detection signal from one of said first and second timing recovery loops, selecting a timing error produced by said one of said first and second timing recovery loops to be utilized in synchronizing both said first and second timing recovery loops with received signals.

2. The synchronization system as set forth in claim 1 wherein said control mechanism further comprises:
   a control unit receiving said sync detection signals from said first and second sync detectors; and
   a multiplexer capable of selectively passing a timing error from either of said first and second timing recovery loops to feedback points within both of said first and second timing recovery loops,
   said control unit selecting said timing error computed by said one of said first and second timing recovery loops and causing said multiplexer to pass said selected timing error to said feedback points within both of said first and second timing recovery loops.

3. The synchronization system as set forth in claim 2 wherein said first and second timing recovery loops each further comprise:
   a sample rate converter sampling a corresponding antenna input and forming said feedback point for said timing recovery loop, said sample rate converter employing said selected timing error to control sampling of said corresponding antenna input.

4. The synchronization system as set forth in claim 3 wherein said first and second timing recovery loops each further comprise:
   a timing recovery unit computing a timing error for said timing recovery loop and passing said timing error to said multiplexer.

5. The synchronization system as set forth in claim 4 wherein said first and second timing recovery loops each initially receive said timing error computed by said timing recovery unit within said respective timing recovery loop until a segment sync is detected by one of said first and second synch detectors.

6. The synchronization system as set forth in claim 4 wherein control unit switches to a timing error produced by an other of said first and second timing recovery loops upon loss of synchronization lock by one of said first and second sync detectors corresponding to said timing recovery loop producing said selected timing error.

7. The synchronization system as set forth in claim 4 wherein said first and second timing recovery loops each further comprise a carrier recovery unit and a signal filter.

8. A receiver comprising:
   first and second antenna inputs; and
   a synchronization system for switching between timing recovery errors comprising:
      first and second timing recovery loops, each coupled to a different antenna input and computing a respective timing error;
      first and second sync detectors coupled respectively to the first and second timing recovery loops; and
      a control mechanism receiving sync detection signals from said first and second sync detectors and, upon receiving a sync detection signal from one of said first and second timing recovery loops, selecting a timing error produced by said one of said first and second timing recovery loops to be utilized in synchronizing both said first and second timing recovery loops with received signals.

9. The receiver as set forth in claim 8 wherein said control mechanism further comprises:
   a control unit receiving said sync detection signals from said first and second sync detectors; and
   a multiplexer capable of selectively passing a timing error from either of said first and second timing recovery loops to feedback points within both of said first and second timing recovery loops,
   said control unit selecting said timing error computed by said one of said first and second timing recovery loops and causing said multiplexer to pass said selected timing error to said feedback points within both of said first and second timing recovery loops.

10. The receiver as set forth in claim 9 wherein said first and second timing recovery loops each further comprise:
    a sample rate converter sampling a corresponding antenna input and forming said feedback point for said timing recovery loop, said sample rate converter employing said selected timing error to control sampling of said corresponding antenna input.

11. The receiver as set forth in claim 10 wherein said first and second timing recovery loops each further comprise:
    a timing recovery unit computing a timing error for said timing recovery loop and passing said timing error to said multiplexer.

12. The receiver as set forth in claim 11 wherein said first and second timing recovery loops each initially receive said timing error computed by said timing recovery unit within said respective timing recovery loop until a segment sync is detected by one of said first and second synch detectors.

13. The receiver as set forth in claim 11 wherein control unit switches to a timing error produced by an other of said first and second timing recovery loops upon loss of synchronization lock by one of said first and second sync detectors corresponding to said timing recovery loop producing said selected timing error.

14. The receiver as set forth in claim 11 wherein said first and second timing recovery loops each further comprise a carrier recovery unit and a signal filter.

15. For use in a dual antenna receiver, a method of switching between timing recovery errors for use in a dual antenna receiver comprising:
   computing a timing error for each of first and second timing recovery loops coupled to a different antenna input;
   monitoring signals processed by the first and second timing recovery loops for a sync signal; and
   responsive to detecting a sync signal within one of the first and second timing recovery loops, selecting a timing error produced by the one of the first and second timing recovery loops to be utilized in synchronizing both the first and second timing recovery loops with received signals.

16. The method as set forth in claim 15 wherein the step of selecting a timing error produced by the one of the first and second timing recovery loops to be utilized in synchronizing both the first and second timing recovery loops with received signals further comprises:
   selectively passing a timing error from either of the first and second timing recovery loops to feedback points within both of the first and second timing recovery loops.

17. The method as set forth in claim 16 further comprising:
   sampling each corresponding antenna input at the feedback point for each respective timing recovery loop;
   employing the selected timing error to control sampling of both antenna inputs.

18. The method as set forth in claim 17 further comprising:
   computing the timing error for each of the first and second timing recovery loops and passing the timing errors to a multiplexer.

19. The method as set forth in claim 17 further comprising:
   initially employing the timing error computed by a timing recovery unit within the respective timing recovery loop until a segment sync is detected by one of the first and second sync detectors.

20. The method as set forth in claim 17 further comprising:
   switching to a timing error produced by an other of the first and second timing recovery loops upon loss of synchronization lock by the one of the first and second sync detectors corresponding to the timing recovery loop producing the selected timing error.

* * * * *